United States Patent
Darroudi et al.

(10) Patent No.: US 8,639,503 B1
(45) Date of Patent: *Jan. 28, 2014

(54) SPEECH COMPRESSION METHOD AND APPARATUS

(71) Applicant: Marvell International Ltd., Hamilton (BM)

(72) Inventors: Khosro Darroudi, Phoenix, AZ (US); Brian R. Mears, Tempe, AZ (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,602

(22) Filed: Jan. 3, 2013

Related U.S. Application Data (63) Continuation of application No. 10/336,668, filed on Jan. 3, 2003, now Pat. No. 8,352,248.

(51) Int. Cl.
*G10L 15/00* (2013.01)
*G10L 19/00* (2013.01)
*G10L 25/00* (2013.01)
*G06F 15/00* (2006.01)

(52) U.S. Cl.
USPC ............................ 704/230; 704/200; 704/231

(58) Field of Classification Search
USPC .......................................... 704/200, 230, 231
See application file for complete search history.

(56) References Cited

U.S. PATENT DOCUMENTS

| 4,610,023 | A | 9/1986 | Noso et al. |
| 5,012,518 | A | 4/1991 | Liu et al. |
| 5,060,269 | A | 10/1991 | Zinser |
| 5,224,167 | A | 6/1993 | Taniguchi et al. |
| 5,233,660 | A | 8/1993 | Chen |
| 5,305,421 | A * | 4/1994 | Li .................................. 704/219 |
| 5,487,128 | A | 1/1996 | Ozawa |
| 5,729,694 | A | 3/1998 | Holzrichter et al. |
| 5,732,392 | A | 3/1998 | Mizuno et al. |
| 5,732,393 | A | 3/1998 | Aoshima |
| 5,754,733 | A | 5/1998 | Gardner et al. |
| 5,835,495 | A | 11/1998 | Ferriere |
| 5,860,512 | A | 1/1999 | Gianvito et al. |
| 5,909,662 | A | 6/1999 | Yamazaki et al. |
| 5,924,062 | A | 7/1999 | Maung |
| 5,974,385 | A | 10/1999 | Ponting et al. |
| 5,983,186 | A | 11/1999 | Miyazawa et al. |
| 6,058,361 | A | 5/2000 | Mainard |
| 6,088,484 | A | 7/2000 | Mead |
| 6,119,086 | A | 9/2000 | Ittycheriah et al. |
| 6,219,643 | B1 | 4/2001 | Cohen et al. |
| 6,336,090 | B1 | 1/2002 | Chou et al. |
| 6,961,698 | B1 | 11/2005 | Gao et al. |
| 6,995,699 | B2 | 2/2006 | Toyama et al. |

* cited by examiner

*Primary Examiner* — Eric Yen (57) ABSTRACT

A method for encoding speech includes processing an input speech signal using an encoder, resulting in a compressed encoder representation of the input speech signal. The method also includes, if a speech recognizer identifies, in the input speech signal, a corresponding dictionary speech element that approximates the input speech signal, determining, with an electronic device, a compressed recognizer representation of the corresponding dictionary speech element, calculating, with the electronic device, one or more differences between the compressed encoder representation and the compressed recognizer representation, and compiling, with the electronic device, compressed speech information that includes representations of the one or more differences. The encoder and the speech recognizer are implemented with the electronic device.

27 Claims, 7 Drawing Sheets

SPEECH COMPRESSION METHOD AND APPARATUS

CROSS-REFERENCES TO RELATED APPLICATIONS

The present application is a continuation of U.S. application Ser. No. 10/336,668, now U.S. Pat. No. 8,352,248, entitled "Speech Compression Method and Apparatus," filed on Jan. 3, 2003, which is hereby incorporated by reference herein in its entirety.

TECHNICAL FIELD

This disclosure relates generally to the field of encoding signals having periodic components and, more particularly, to techniques and devices for digitally encoding speech waveforms.

BACKGROUND

Voice encoders are commonly used to compress speech data for storage or transmission over a channel. Compression enables an increase in the number of communication channels available to a digital communication system by decreasing the bandwidth allocated to each channel.

A variety of speech compression algorithms are available to encode speech signals. For example, one popular encoding technique is code excited linear predictive (CELP) coding, which has proven effective for bit rates in a range of 4-16 kilobits/second.

BRIEF DESCRIPTION OF THE DRAWINGS

Embodiments of the invention are particularly pointed out and distinctly claimed in the concluding portion of the specification. However, embodiments of the invention, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of embodiments of the invention. However, it will be understood by those skilled in the art, that the embodiments of the invention may be practiced without these specific details. In other instances, well-known methods, procedures, components, and circuits have not been described in detail so as not to obscure the embodiments of the invention.

Digital speech coding can be broken in two parts; encoding and decoding, sometimes known as analysis and synthesis. An encoder receives digitized input speech, extracts parameters describing the features of the speech, and quantizes those parameters into a source bit stream that is sent to a channel. A decoder receives the bit stream from the channel and reconstructs the output speech waveform using the quantized features in the received bit stream. Desirably, the reconstructed speech signal has relatively good speech quality when compared to the original input speech.

Figure 1:
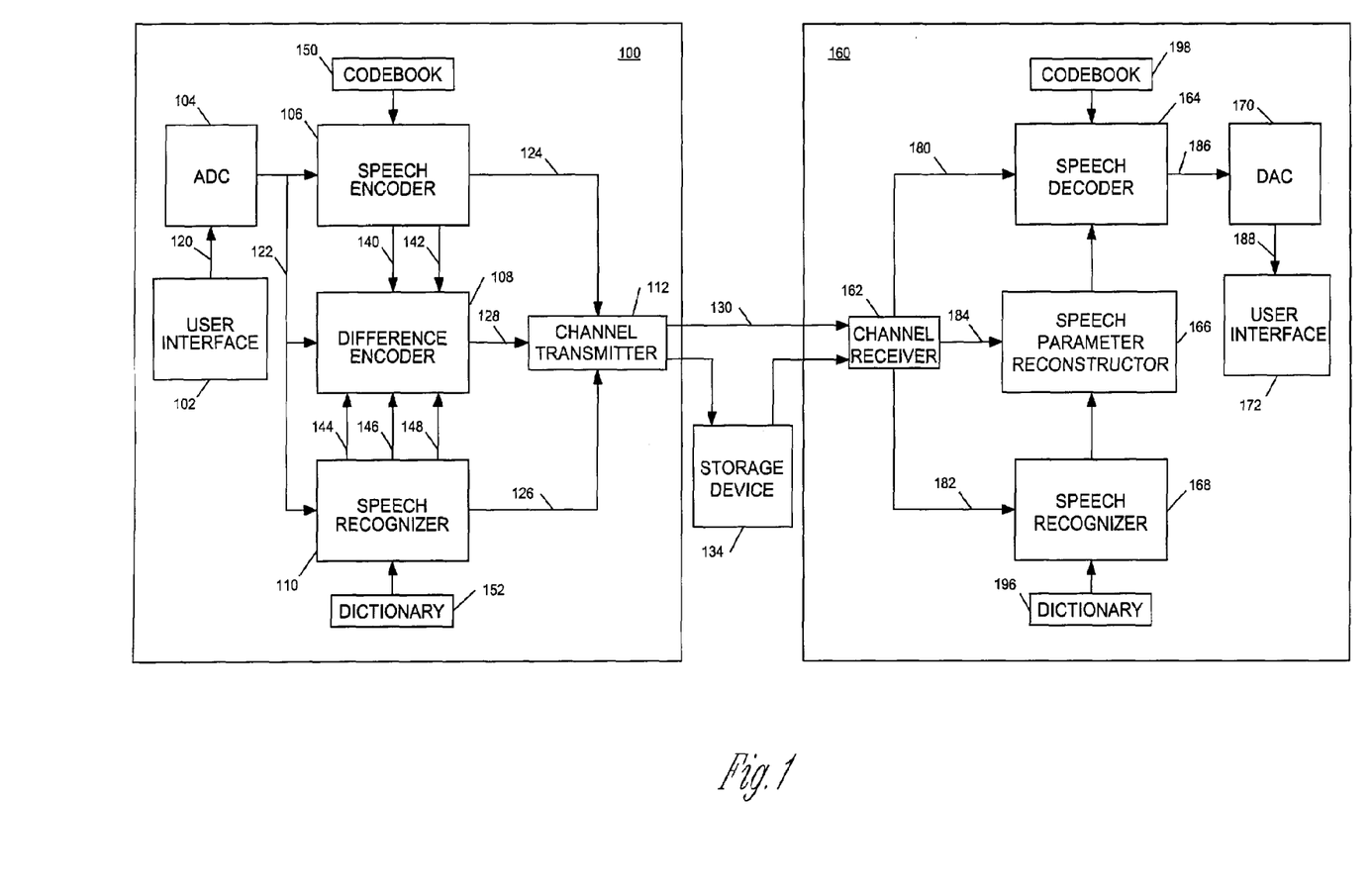
FIG. 1 is a simplified example of a speech encoder and a speech decoder in which embodiments of the invention may be practiced.

FIG. 1 is a simplified example of an encoder within a first communication device 100 and a decoder within a second communication device 160, in which embodiments of the invention may be practiced. The encoder and decoder are illustrated as each residing in a distinct device 100, 160, respectively (e.g., a wired or wireless communication device, computer, or other electronic device). This characterization is used for convenience, to explain how a particular input speech signal is encoded by an encoder in a first device, then the encoded speech is transmitted over a channel to a second device (or stored), and then decoded by a decoder in the second device.

If a device is a two-way communication device, both an encoder and decoder can reside in the same device. The encoder encodes speech input by a user of the device, and the decoder decodes speech received over the channel from an encoder in a remote device. In other cases, a single device could encode speech, and store the encoded version for later decoding by a decoder within the device. Still other configurations would be apparent to those of skill in the art.

First device 100 includes, in one embodiment, a user interface 102, analog-to-digital converter (ADC) 104, speech encoder 106, difference encoder 108, speech recognizer 110, and channel transmitter 112. Briefly, the basic operation of the device 100 is as follows. An input speech signal is provided by a user of device 100 through user interface 102, which could include a microphone. The analog signal 120 is then processed by ADC 104 to produce digital speech samples 122. As is described in more detail later, speech encoder 106, difference encoder 108, and speech recognizer 110 then work in cooperation to produce various parameters 124, 126, 128 that are compiled as a compressed representation of the input speech.

Channel transmitter 112 then transmits the compressed speech information as a bit stream over a communication channel 130 to second communication device 160, which may or may not be remote from the first communication device 100. Channel 130 could be a wired or wireless communication channel. If channel 130 is a wired communication channel, devices 100, 160 could include hardware interfaces that are operably connectable to that channel. If channel 130 is a wireless communication channel, devices 100, 160 could include antennas (e.g., dipole or other antennas) or other optical or RF hardware that enables a signal to be transmitted across an air interface. Alternatively, the compressed speech information could be stored in a storage device 134.

Upon receiving the compressed speech information, second device 160 reconstructs the speech. In one embodiment, second device 160 includes a channel receiver 162, speech decoder 164, speech parameter reconstructor 166, speech recognizer 168, digital-to-analog converter (DAC) 170, and user interface 172.

The channel receiver 162 receives the compressed speech information from the channel 130 or storage device 134. In one embodiment, channel receiver 162 provides encoder-derived speech parameters 180 to speech decoder 164, and provides encoded difference parameters 184 to speech parameter reconstructor 166. In addition, channel receiver 162 also receives dictionary indices, when the speech recognizer 110 has recognized a speech element, where the term "speech element" is meant to include a word, feature or phoneme.

The dictionary indices 182 are provided to speech recognizer 168. Channel receiver 162 may also receive information that indicates that time warping was performed on the recognizer-derived speech parameters. If this is the case, channel receiver 162 also passes the warping information 184 to speech parameter reconstructor 166.

The speech decoder 164, speech parameter reconstructor 166, and speech recognizer 168 then work in cooperation to produce a reconstructed, digital version of the speech 186. DAC 170 then converts the digital speech into a reconstructed analog speech signal 188. User interface 172, which could include a speaker, then outputs the reconstructed analog speech signal in a format that is perceptible to a user of the second communication device 160.

Referring again to the first communication device 100, the operation of the speech encoder 106, difference encoder 108, and speech recognizer 110 will now be described in more detail. In one embodiment, both speech encoder 106 and speech recognizer 110 simultaneously process the input speech signal 122. Speech encoder 106 is primarily responsible for producing the compressed speech parameters that are sent over the channel 130 (or stored). However, if speech recognizer 110 recognizes a speech element within the input speech signal 122, difference encoder 108 uses information from both speech encoder 106 and speech recognizer 110 to produce "difference parameters," which characterize the input speech in a manner that may require fewer bits than the corresponding parameters produced solely by the speech encoder 106. For the recognized speech, the difference parameters produced by difference encoder 108 are included in the bit stream, instead of including the corresponding parameters created by the speech encoder 106.

In one embodiment, speech encoder 106 is an analysis-by-synthesis encoder, such as a code excited linear predictive (CELP) coder, for example. In alternate embodiments, speech encoder 106 could be one of many other linear predictive coders, derivatives of the CELP coder (e.g., vector sum excited linear prediction (VSELP) or numerous other derivatives), a Mixed-Excitation Linear Predictive (MELP) coder, or another encoder that produces excitation and/or formant filter parameters, which are described below.

The function of speech encoder 106 is to compress the digital speech signal 122 into a low bit rate signal by removing the natural redundancies in the speech. Speech typically has short-term redundancies, due primarily to the filtering operation of the lips and tongue, and long-term redundancies, due to the vibration of the vocal cords. In a CELP coder, these operations are modeled by two filters, a short-term formant filter and a long-term pitch filter. Once these redundancies are removed, the resulting residual signal can be modeled as white Gaussian noise, referred to as excitation. The excitation also is encoded.

The basis of the CELP technique is to compute the parameters of the formant filter and the pitch filter. The formant filter performs short-term prediction of the speech waveform. The pitch filter performs long-term prediction of the speech waveform. Finally, these filters must be excited, and this is done by determining which one of a number of random excitation waveforms results in the closest approximation to the original speech when the waveform excites the formant filter and the pitch filter. The formant filter and pitch filter parameters are quantized using a scheme to quantize LPC parameters and an adaptive codebook, respectively.

Thus, the transmitted parameters relate to three items (1) the formant filter, (2) the pitch filter, and (3) the excitation. Specifically, the CELP algorithm produces (1) a fixed codebook index and gain to represent the formant filter, (2) an adaptive codebook index and gain to represent the pitch filter, and (3) a representation of a set of excitation pulse locations (e.g., data indicating the locations themselves, or a codebook index that identifies a set of excitation pulse locations within an excitation codebook).

In one embodiment of the invention, the parameters describing the formant filter and/or the excitation are represented differently when the speech recognizer 110 identifies a speech element in the input speech signal. This alternate representation can take fewer bits than the encoder representation of the formant filter and/or the excitation. Thus, when a speech element is recognized, the device 100 transmits this alternate representation, rather than transmitting the fixed codebook index and excitation information generated by the encoder 106.

Below, under separate headings, explanations are given of how the formant filter parameters and excitation parameters are represented in accordance with embodiments of the invention. Before this more detailed explanation, a general explanation is given of when and how the alternate representation of the formant filter and excitation parameters is generated.

As mentioned previously, encoder 106 and speech recognizer 110 simultaneously processes the input speech signal 122. In one embodiment, speech recognizer 110 uses a Hidden Markov Model (HMM) to recognize N different speech elements, which are stored within a dictionary 152. For example, the dictionary 152 could have 65,000 speech elements, and thus N=65,000. Alternatively, the dictionary 152 could have more or fewer entries.

If a match can be found between the input speech 122 and a speech element in the dictionary 152, an index 126 identifying the speech element is provided to the channel transmitter 112 for transmission to the second device 160. The second device 160 also has access to an identical dictionary 196. Accordingly, the speech element can be identified by the second device 160 using only the received index 182.

If the speech recognizer 110 identifies the speech element, the speech recognizer 110 provides a control signal 144 to difference encoder 108, along with recognizer-derived information 146, 148 describing the formant filter and/or the excitation associated with the corresponding dictionary entry. In one embodiment, encoder 106 also provides encoder-derived information 140, 142 describing the formant filter and/or the excitation to difference encoder 108.

Difference encoder 108 then calculates one or more sets of differences between the encoder representation of the speech element and the recognizer representation of the speech element. The difference information 128 is then provided to the channel transmitter 112, which transmits the difference information instead of the encoder representation of the formant filter and/or excitation.

In one embodiment, the number of bits used to represent the difference information 128 is less than the number of bits used to represent the speech encoder representation of the formant filter and/or excitation. Accordingly, the various embodiments produce a frame/subframe format that consumes less bandwidth while still achieving a high level of perceived, reconstructed speech quality.

Figure 2:
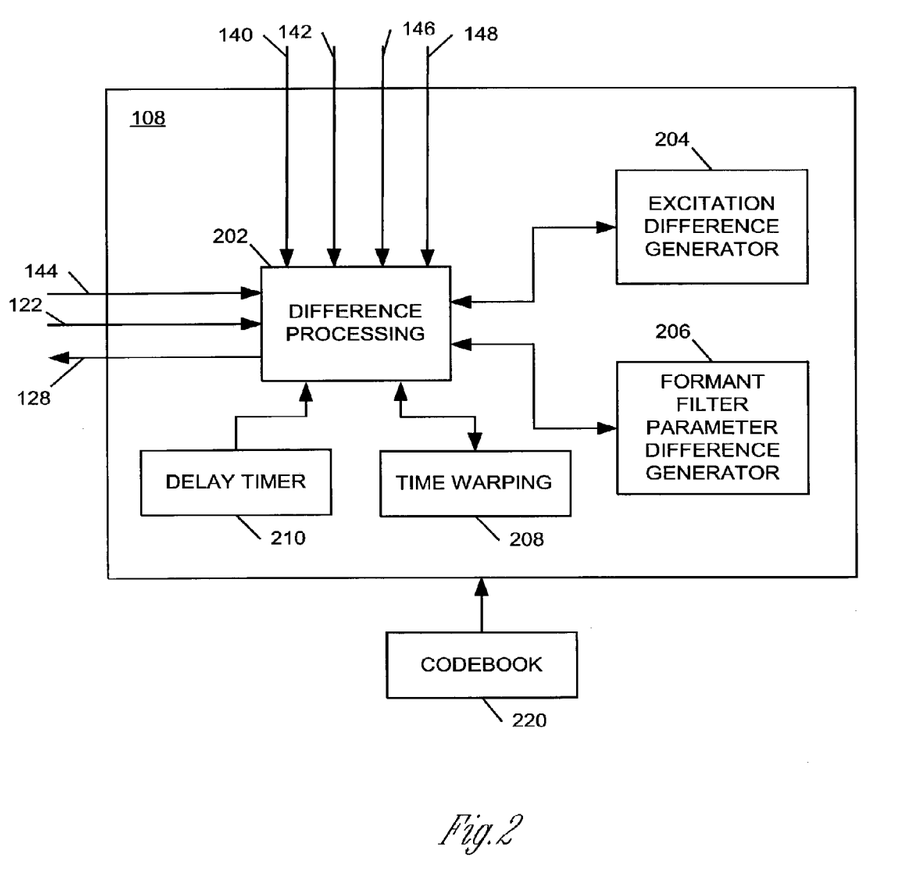
FIG. 2 is a simplified block diagram of a difference encoder in accordance with an embodiment of the invention.

FIG. 2 illustrates a simplified block diagram of a difference encoder 108 (e.g., difference encoder 108, FIG. 1), in accordance with an embodiment of the invention. Because difference encoder 108 interacts with a speech encoder (e.g., encoder 106, FIG. 1) and a speech recognizer (e.g., recognizer 110, FIG. 1), references are made to elements of FIG. 1 in the below description. Accordingly, for ease of understanding, FIGS. 1 and 2 should be viewed together when reading the following description of FIG. 2.

As described previously, when speech recognizer 110 recognizes a speech element within the input speech signal 122, difference encoder 108 calculates the differences between speech parameters 140, 142 derived by a speech encoder 106 and speech parameters 146, 148 derived by the speech recognizer 110. The difference encoder 108 then quantizes the differences, and the quantized differences replace corresponding encoder-derived parameters in the transmitted bit stream.

In one embodiment, difference encoder 108 includes a difference processing block 202, an excitation difference generator 204, a formant filter parameter difference generator 206, a time warping block 208, and a delay timer block 210. In addition, difference encoder 108 can use one or more codebooks 220 of stored difference parameters to quantize speech parameter differences.

In one embodiment, difference processing block 202 is responsible for invoking the difference generators 204, 206 to calculate differences between encoder-derived parameters 140, 142 and recognizer-derived parameters 146, 148. In addition, in one embodiment, difference processing block 202 also adjusts the recognizer-derived parameters 146, 148, when appropriate, so that the encoder-derived speech parameters 140, 142 and the recognizer-derived speech parameters have comparable formats.

In one embodiment, difference processing block 202 receives a control signal 144 from the speech recognizer 110, indicating that the recognizer has recognized a speech element in the input speech signal 122, and has identified an index to a corresponding dictionary entry. Upon receipt of this control signal 144, difference processing block 202 determines whether the speech element has been recognized in sufficient time, as explained in the next few paragraphs.

As described previously, the speech encoder 106 and speech recognizer 110 simultaneously process the input speech signal 122. Speech encoder 106 uses a frame-based algorithm, in one embodiment, meaning that encoder 106 produces speech parameters for very small segments of speech (e.g., frames and subframes), where each speech element includes a set number of samples. For example, a subframe could be 20 milliseconds, and a frame could include four subframes. Different subframe and frame sizes could be used in alternate embodiments.

A single speech element could include multiple subframes and frames. For example, a speech element having a 1.0 second duration would include 50 subframes, assuming a 20 millisecond subframe size. Some speech parameters (e.g., excitation parameters) may be produced for each subframe, and other speech parameters (e.g., formant filter parameters) may be generated for every other subframe, or only once per frame. Regardless, encoder 106 would produce a substantial number of sets of speech parameters for a speech element having a 1.0 second duration.

Each set of speech parameters corresponding to a frame and/or subframe can be transmitted as it is generated. However, in an embodiment of the invention, each set of speech parameters is not necessarily transmitted as it is generated. Instead, if a potential speech element onset has been identified, sets of encoder-derived speech parameters are temporarily stored, in order to give the recognizer 110 sufficient time to determine whether a speech element can be identified from the input speech. In one embodiment, if no potential speech element onset has been identified (e.g., if a silent interval is occurring), the encoder-derived speech parameters can be transmitted as they are generated by encoder 106. If the encoder is an adaptive multi-rate (AMR) encoder, the bit rate of the transmitted parameters could vary, depending on whether speech appears to be occurring or not.

In one embodiment, delay timer 210 is used to set a maximum amount of time that the system will wait before transmitting the stored sets of encoder-derived speech parameters. Delay timer 210 is initiated to count down this maximum amount of time when a potential speech element onset is identified from the input speech 122.

For example, a system may give recognizer 110 a maximum delay of 1.0 second to identify a speech element. If the recognizer 110 indicates that a speech element is recognized before expiration of the 1.0 second maximum delay, then the system will instead transmit the difference parameters calculated by difference encoder 108 for the speech element, rather than sending the corresponding stored, encoder-derived speech parameters. Conversely, if the recognizer 110 makes no such indication before the 1.0 second maximum delay expires, then the stored, encoder-derived speech parameters will be transmitted. Values greater than or less than 1.0 second could alternatively be used for the maximum delay, depending on the amount of delay that is tolerable in the system.

In one embodiment, in order to reduce the time delay, recognizer 110 can utilize phoneme recognition, by incorporating phonemes into the dictionary. A phoneme is a speech element, which may be a part of a word or a whole word, in some cases. The duration of a phoneme may be substantially less than the duration of a typical word, unless the word itself is very short (e.g., a single sound word). Accordingly, a particular word may include multiple phonemes. For example, the word "hello" could be represented by phonemes having the sounds "heh," "ll," and "oh."

In an embodiment that uses phoneme recognition, the maximum possible delay could be set to a relatively smaller value than the value used in an embodiment that relies more heavily on whole-word recognition. For example, the maximum possible delay could be set to a value in a range of 0.1 to 0.5 seconds, although larger or smaller values also could be used. Within the dictionary, entries could include words, features, and phonemes having durations of approximately the maximum possible delay value or less. Using this technique, the time delay could be reduced, while still having a relatively high likelihood that the recognizer 110 will recognize a speech element before expiration of the delay timer 210.

In an alternate embodiment, instead of using a delay timer to help in the determination of when to send encoder-derived speech parameters, a sliding window can be employed. The width of the window can be defined by a value similar to the maximum time delay value. For example, the width of the window can be such that it includes a number of samples corresponding to 1.0 seconds of speech, at any one time, although wider or narrower windows could be used as well.

In this embodiment, the window is basically a first-in-first-out buffer of a particular size (i.e., as defined by the window width) through which input speech samples are continuously moved. The recognizer can continuously process the samples within the window and may, at any time, determine that a speech element is recognized. Once the speech element is recognized, a determination can be made of the speech element duration based on the number of samples in the element.

Referring back to FIG. 2 and the previous embodiment, where a delay timer is implemented, if the delay timer 210 has not expired, and recognizer 110 has indicated that it has recognized a speech element, difference processing block 202 determines whether it is appropriate to compensate for differences in the duration of the input speech element and the duration of the corresponding dictionary entry identified by the recognizer 110. This processing is performed, in one embodiment, because the duration of a speech element as it is spoken by the user of the device can be different from the duration of the corresponding dictionary entry.

If difference processing block 202 decides to compensate for the duration difference, then difference processing block 202 invokes time warping block 208 to affectively adjust the speech parameters 146, 148 provided by the recognizer 110, so that they represent a speech element having approximately the same duration as the input speech element duration. Time warping is a process that is known by those of skill in the art.

As an example, assume a user takes 1.2 seconds to utter the word "hello," but the generic, dictionary-version of the word "hello" has a duration of only 1.0 second. Assuming the encoder 106 processes speech based on a 20 millisecond subframe size, the encoder would produce approximately 60 sets of speech parameters to encode the 1.2 second input speech word. However, similar encoding of the dictionary-version of the word would require only approximately 50 sets of speech parameters. Because the number of sets of speech parameters provided by the encoder 106 is different from the number of sets provided by the recognizer 110, a 1-to-1 comparison of the encoder-derived and recognizer-derived sets of speech parameters is not possible.

In one embodiment, difference processing block 202 compensates for this difference as follows. First, when difference encoder 108 receives the control signal 144 from the recognizer 110 indicating that a speech element has been recognized, difference processing block 202 calculates a duration of the input speech element based on the delay timer value 210, which indicates how much time has transpired since a potential speech element onset was recognized. Difference processing block 202 also receives or determines the duration of the corresponding dictionary entry.

Block 202 then determines a duration difference between the input speech element duration and the dictionary entry duration. If the duration difference exceeds a maximum difference value, then difference processing block 202 invokes time warping block 208 to affectively adjust the speech parameters 146, 148 provided by the recognizer 110, so that they represent a speech element having approximately the same duration as the input speech element duration. In various embodiments, the maximum difference value could be a time period (e.g., 0.01 seconds, or more or less) or it could be a percentage of either the input speech or dictionary speech element durations (e.g., 1.0% of the input speech duration, or more or less). If the duration difference does not exceed the maximum difference value, then time warping is not performed, in one embodiment.

In an alternate embodiment, difference processing block 202 could compare the number of sets of speech parameters produced by the encoder 106 since a potential speech element onset was identified to the number of sets of speech parameters provided by the recognizer 110 for the speech element. If the number of sets is different, then difference processing block 202 could invoke time warping block 208 to harmonize the numbers of sets provided by the encoder 106 and recognizer 110.

Assuming the speech element was recognized before expiration of the delay timer 210, difference processing block 202 invokes the difference generators 204, 206 to calculate differences between encoder-derived parameters 140, 142 and recognizer-derived parameters 146, 148, which may or may not have been time warped. In one embodiment, difference processing block 202 passes the encoder derived and recognizer-derived parameters to generators 204, 206, either in their original or time-warped forms. Alternatively, generators 204, 206 could receive these parameters from other sources (e.g., from storage and/or directly from encoder 106 and/or recognizer 110).

In one embodiment, a first difference generator 204 is used to determine the differences between encoder-derived excitation and recognizer-derived excitation, and a second difference generator 206 is used to determine the differences between encoder-derived formant filter parameters and recognizer-derived formant filter parameters. In other embodiments, only one or the other type of speech parameter could be differentiated (e.g., excitation or formant filter parameters, but not both), or different speech parameters could be differentiated.

Once the differences are determined, they are passed back to difference processing block 202, in one embodiment. Block 202 then quantizes the difference parameters (e.g., using codebook 220), and sends the quantized difference parameters 128 to be incorporated into the bit stream in place of the encoder-derived speech parameters.

The specific way that a particular speech parameter is differentiated and quantized depends on the format and type of the speech parameter. For example, the formant filter could be represented by a particular number (e.g., 10, 12, etc.) of Linear Predictive Coding (LPC) parameters. Alternatively, it could be represented by a particular number of Line Spectral Pair (LSP) parameters, or some other parameters. Similarly, the excitation could be represented by a particular number (e.g., 10, 8, 6, etc.) of excitation pulse locations and signs, or the excitation could be represented in some other way.

A specific embodiment is described below, which differentiates between formant filter parameters and excitation parameters of particular types, numbers, and formats. It would be obvious to one of skill in the art, based on the description herein, that the types, numbers, and formats of the differentiated formant filter and excitation parameters could be different from the specific embodiment described herein. Accordingly, differentiation of formant filter and excitation parameters of different types, numbers, and formats is contemplated to be within the scope of the invention.

In the subsection entitled "Formant Filter Parameters," below, a description is given of how a specific encoder and recognizer may represent formant filter parameters, and how the differences between the encoder-derived and recognizer derived representations may be determined and encoded by difference encoder 108. Similarly, in the subsection entitled "Excitation Parameters," below, a description is given of how a specific encoder and recognizer may represent excitation parameters, and how the differences between the encoder-derived and recognizer-derived representations may be determined. The below embodiments are not meant to limit the scope of the invention to these embodiments. Instead, those of skill in the art would realize, based on the description herein, that alternative representations of formant filter parameters and/or excitation parameters could be used in conjunction with embodiments of the invention.

Formant Filter Parameters

The formant filter parameters derived by the encoder 106 (FIG. 1) and the recognizer 110 are similar in type, in one embodiment. The parameters derived by the encoder 106 are derived based on the input speech signal 122. Conversely, the parameters derived by the recognizer 110 are derived based on the dictionary speech element identified during the recognition process. In one embodiment, the recognizer 110 re-derives the parameters from the dictionary speech element each time the speech element is identified. In an alternate embodiment, the parameters could be stored along with each speech element, and simply retrieved when a speech element is identified. Derivation of formant filter parameters by the encoder 106 and the recognizer 110 could be performed based on similar theories. For the purposes of brevity, only the encoder derivation is explained in detail, below.

Using a CELP coder, the parameters of the formant filter are calculated through a linear predictive coding (LPC) analysis. Accordingly, the formant filter is also commonly referred to as an LPC filter. Using LPC analysis, a unique set of predictor coefficients (also referred to herein as "feature vectors" and "LPC parameters") for the input speech is determined by minimizing the sum of the squared differences between the input speech samples and the linearly predicted speech samples.

The LPC parameters can be characterized as a set of line spectral pairs (LSPs). For example, a set of ten LSPs could be used to characterize the LPC parameters, although more or fewer LSPs could be used, as well.

Using a CELP coder, each set of LSPs can be quantized using a vector quantizer. A vector quantizer utilizes a codebook, where each entry includes a unique combination of LSPs. An index of a codebook entry that represents a close match to the input speech LSPs is determined by the vector quantizer, and transmitted over the channel. In some cases, a split vector quantizer can be used, in which different codebooks are used to quantize portions of a set of LSPs.

Figure 3:
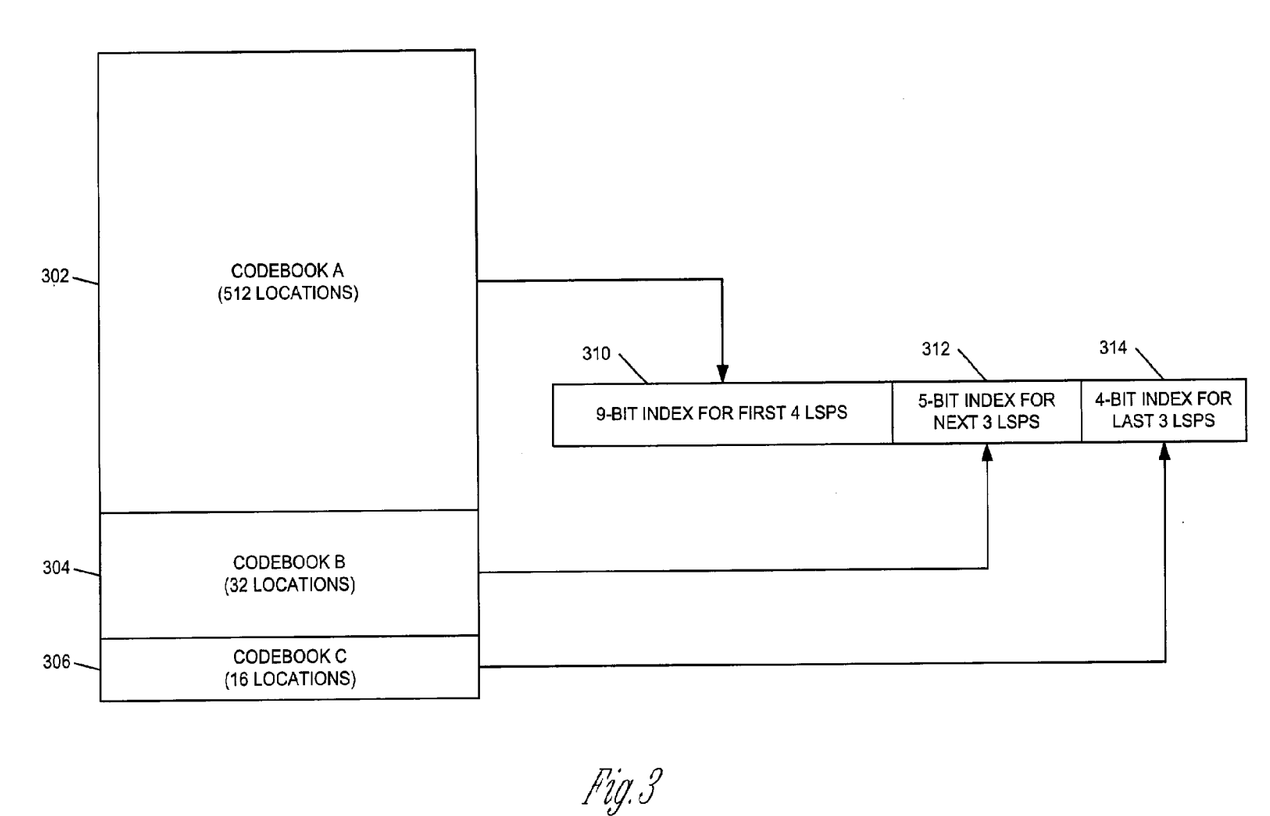
FIG. 3 illustrates an example of a split vector codebook for quantizing formant filter parameters in accordance with an embodiment of the invention.

FIG. 3 illustrates a split vector quantizer codebook. The codebook includes three portions 302, 304, 306, labeled respectively as "Codebook A," "Codebook B," and "Codebook C." Codebook A 302 is used to quantize a first portion of a set of LSPs, Codebook B 304 is used to quantize a second portion of the set of LSPs, and Codebook C 306 is used to quantize a third portion of the set of LSPs. For example, assume a set of LSPs includes ten LSPs. Codebook A 302 could be used to quantize the first four LSPs, Codebook B 304 could be used to quantize the next three LSPs, and Codebook C 306 could be used to quantize the last three LSPs. Accordingly, three codebook indices 310, 312, 314 would be identified in order to quantize the set of ten LSPs.

In one embodiment, Codebook A includes 512 entries, each of which can be uniquely identified using a nine-bit index 310. Codebook B is substantially smaller, including 32 entries, each of which can be uniquely identified using a five-bit index 312. Finally, Codebook C is smaller still, including 16 entries, each of which can be uniquely identified using a four-bit index 314. Accordingly, in order to transmit the indices 310, 312, 314 for the three codebooks, 18 bits are used.

In other embodiments, more or fewer than ten LSPs could be used to characterize the speech. Also, more or fewer than three fixed codebooks could be used to quantize the LSPs, and more or fewer entries than are described above could be included in each codebook. Accordingly, more or fewer than 18 bits could be used to quantize the LSPs.

As described previously, the quantized formant filter parameters derived by the encoder 106 (FIG. 1) are not included in the bit stream when the speech recognizer 110 recognizes a speech element before expiration of a delay timer (e.g., timer 210, FIG. 2). Instead, a difference encoder (e.g., encoder 108, FIGS. 1, 2) determines differences between the encoder-derived representation of the formant filter parameters from the input speech, and the recognizer-derived representation of the formant filter parameters of the corresponding dictionary speech element.

In one embodiment, after time warping has been applied to the recognizer-derived formant filter parameters, if appropriate, the format and number of encoder derived formant filter parameters correlates with the format and number of recognizer-derived formant filter parameters. Because a speech element is encoded on a frame-by-frame and subframe-by-subframe basis, multiple sets of encoder-derived and recognizer-derived formant filter parameters are differentiated for the speech element.

In one embodiment, the formant filter parameter difference generator 206 (FIG. 2) calculates the mean square difference between each corresponding encoder-derived parameter and recognizer-derived parameter. For a particular frame, the set of formant filter parameter differences is then encoded, using a formant filter difference codebook 220, FIG. 2.

Figure 4:
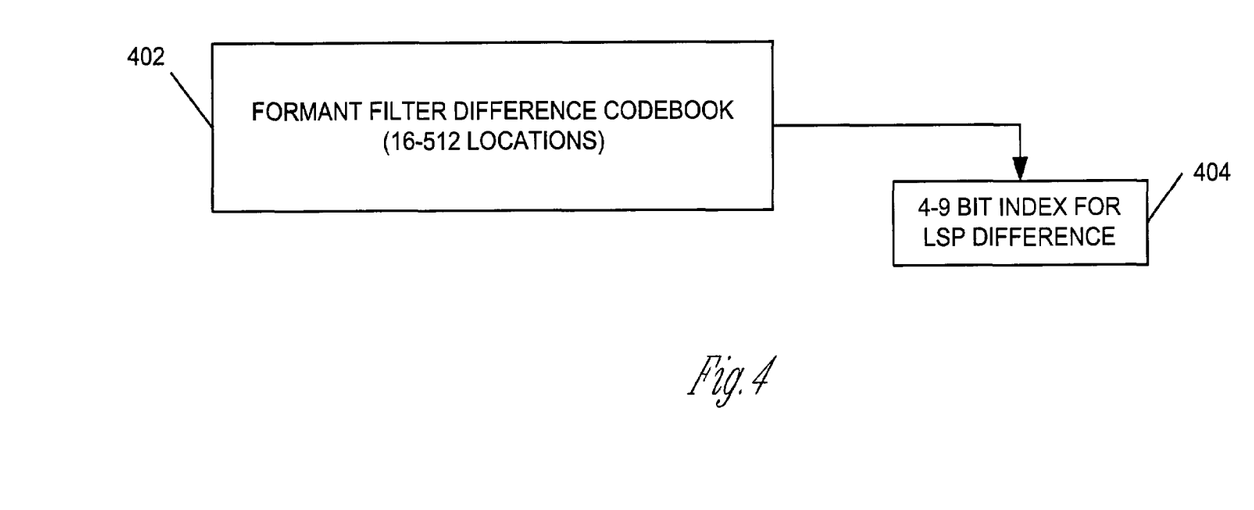
FIG. 4 illustrates an example of a formant filter parameter difference codebook for quantizing differences between encoder-derived and recognizer-derived formant filter parameters in accordance with an embodiment of the invention.

FIG. 4 illustrates a formant filter parameter difference codebook 402, in accordance with an embodiment of the invention. In one embodiment, only a single codebook 402 is used to quantize the formant filter parameter differences for a particular frame or subframe. Accordingly, where the formant filter for a frame or subframe is represented by a set of ten LSPs, each entry in the difference codebook 402 would be used to quantize a set of ten LSP differences. In alternate embodiments, a split vector codebook could be used.

In one embodiment, the size of the formant filter parameter difference codebook 402 is substantially smaller than the size of the split vector codebook (FIG. 3) used by the encoder 106 (FIG. 1) to quantize the encoder-derived formant filter parameters. Accordingly, fewer bits are required to quantize the formant filter parameter differences than are required to quantize the encoder-derived formant filter parameters.

The use of a smaller codebook to encode the differences would not necessarily result in lower quality speech. On the contrary, the use of a smaller codebook is possible because the range of values of the parameter differences could be substantially smaller than the range of values of the formant filter parameters, themselves.

For example, assume an encoder-derived LSP has a value of 1.07 prior to quantization by the encoder 106 (i.e., the LSP value represents the true speech value, and not the quantized value), and a corresponding recognizer-derived LSP has a value of 0.9. The difference between the two values would be calculated by the difference generator as 1.07−0.9=0.17. The difference value of 0.17 is substantially smaller than the LSP values themselves. Accordingly, in an embodiment of the invention, it is possible to quantize the difference values using a substantially smaller difference codebook (FIG. 4) than the split vector quantizer codebook (FIG. 3) used by the encoder 106 (FIG. 1) to quantize the LSP values themselves.

In one embodiment, the formant filter difference codebook has a number of entries in a range of 16-512 entries. Accordingly, an index 404 to an entry of the codebook 402 can be represented in as few as 4-9 bits. Compared with the 18 bits used to quantize the LSPs in the above-described embodiment of the CELP coder, quantization of the differences between the LSPs can be achieved in half or fewer bits than the encoder quantization.

Assuming that the receiver has the dictionary index to the corresponding recognized speech element, and thus has (or is able to derive) the recognizer-derived formant filter parameters, the receiver is also able to reconstruct the encoder-derived formant filter coefficients using the recognizer-derived formant filter parameters and the received index to the formant filter parameter difference codebook 220 (FIG. 2), which is also resident at the receiver. Reconstruction of the speech signal is described later in conjunction with FIG. 7.

Excitation Parameters

The excitation parameters derived by the encoder 106 (FIG. 1) and the recognizer 110 are similar in type, in one embodiment. The parameters derived by the encoder 106 are derived based on the input speech signal 122. Conversely, the parameters derived by the recognizer 110 are derived based on the dictionary speech element identified during the recognition process. In one embodiment, the recognizer 110 re-derives the parameters from the dictionary speech element each time the speech element is identified. In an alternate embodiment, the parameters could be stored along with each speech element, and simply retrieved when a speech element is identified. Derivation of excitation parameters by the encoder 106 and the recognizer 110 could be performed based on similar theories. For the purposes of brevity, only the encoder derivation is explained in detail, below.

Using a CELP coder, the excitation can be represented as a number of excitation pulse locations (and their signs) within a number of samples. For example, excitation could be represented with the locations of ten excitation pulses within a set of 40 samples, along with information that indicates which pulses are positive and which are negative. In alternate embodiments, more or fewer pulse positions and their signs could be determined within more or fewer samples.

In one embodiment, the location of each excitation pulse and information describing the signs of the excitation pulses are transmitted every subframe. In an alternate embodiment, each combination of pulse position locations and signs are included in an excitation codebook. During the analysis-by-synthesis procedure, the excitation codebook entries are used to excite the formant and pitch filters, and an index to a codebook entry that produces good (e.g., the best) synthesized speech is identified.

In one embodiment, each of the excitation pulses, i0-in (where n is an integer) are restricted to take one of a subset of positions within the samples. For example, with ten excitation pulses, i0-i9, located within 40 samples, each excitation pulse could be restricted to be located at one of a pre-determined set of possible locations according to the following example Table 1:

TABLE 1

Allowable pulse positions

| pulses | allowable locations |
| --- | --- |
| i0, i1 | 0, 5, 10, 15, 20, 25, 30, 35 |
| i2, i3 | 1, 6, 11, 16, 21, 26, 31, 36 |
| i4, i5 | 2, 7, 12, 17, 22, 27, 32, 37 |
| i6, i7 | 3, 8, 13, 18, 23, 28, 33, 38 |
| i8, i9 | 4, 9, 14, 19, 24, 29, 34, 39 |

According to the above table, pulses i0 and i1 can only be located at positions 0, 5, 10, 15, 20, 25, 30, and 35. Accordingly, i0 will never be found at position 3. Because each pulse can be located at only one of eight possible locations, the location of each pulse can be identified with three bits. So for ten pulses, 30 bits are used to encode the pulse positions. In addition, the sign of each pulse can be represented with one bit, although in some embodiments, only the sign of every other pulse is quantized. Accordingly, five additional bits are used to encode the sign information, yielding a total bit count for representing the pulse positions and their signs of 35 bits.

Figure 5:
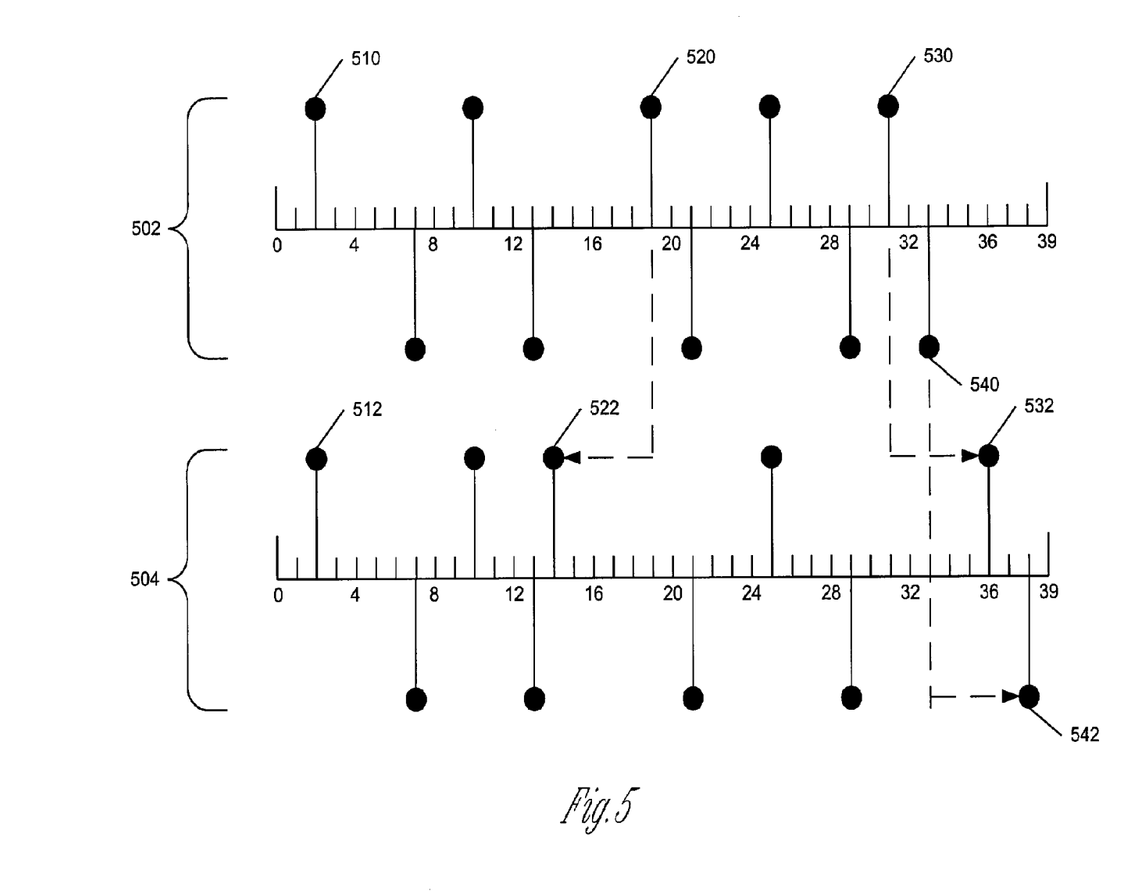
FIG. 5 illustrates an example of encoder-derived and recognizer-derived excitation pulse positions in accordance with an embodiment of the invention.

FIG. 5 illustrates an example of an encoder-derived set of ten excitation pulses 502 located within 40 samples. According to the example, the excitation pulses 502 are located at sample positions 2, 7, 10, 13, 19, 21, 25, 29, 31, and 33.

As described previously, the excitation parameters derived by the encoder 106 (FIG. 1) are not included in the bit stream when the speech recognizer 110 recognizes a speech element before expiration of a delay timer (e.g., timer 210, FIG. 2). Instead, a difference encoder (e.g., encoder 108, FIGS. 1, 2) determines differences between the encoder-derived representation of the excitation parameters from the input speech, and the recognizer-derived representation of the excitation parameters of the corresponding dictionary speech element.

In one embodiment, after time warping has been applied to the recognizer-derived excitation parameters, if appropriate, the format and number of encoder derived excitation parameters correlates with the format and number of recognizer-derived excitation parameters. Because the excitation for a speech element is encoded on a subframe-by-subframe basis, multiple sets of encoder-derived and recognizer-derived excitation parameters are differentiated for the speech element.

In one embodiment, the excitation parameter difference generator 204 (FIG. 2) determines whether each corresponding excitation pulse location between the encoder-derived locations and the recognizer-derived locations are identical, or are offset by one, two, or more allowable locations. Reference again to FIG. 5 will clarify the difference calculation.

As discussed above, pulses 502 could represent encoder-derived excitation pulse positions and signs. Similarly, pulses 504 could represent recognizer-derived excitation pulse positions and signs. In the given example, both the encoder and recognizer identify the locations of ten pulses, where pulses correspond between the encoder and recognizer representations on a 1-to-1 basis.

Referring also to Table 1, above, since pulses 510 and 512 are located at pulse position 2, pulses 510 and 512 could represent pulse i4 (or i5) for the encoder-derived and recognizer-derived excitation, respectively. Because both pulses are in the same location, no difference exists between the encoder-derived pulse i4 and the recognizer-derived pulse i4.

However, differences do exist between some of the other corresponding pulses. For example, pulses 520 and 522 are located at pulse positions 19 and 14, respectively. Due to their positions, pulses 520, 522 could represent pulse i8 (or i9) for the encoder-derived and recognizer-derived excitation, respectively. Referring again to Table 1, above, it is apparent that the recognizer-derived pulse 522 occurs one pulse position earlier than the encoder-derived pulse 520.

It may be highly likely that an encoder-derived pulse (e.g., pulse 510) and a corresponding recognizer-derived pulse (e.g., pulse 512) occur at exactly the same position. In addition, it may be somewhat less likely, although still relatively likely, that an encoder-derived pulse (e.g., pulse 520) and a corresponding recognizer derived pulse (e.g., pulse 522) are offset from one another by a single, allowable pulse position. In the case of pulses 520, 522, the recognizer-derived pulse 522 occurs one possible pulse position earlier than the encoder-derived pulse 520. Alternatively, as is the case with pulses 530, 532 and pulses 540, 542, the recognizer-derived pulses 532, 542 occur one possible pulse position later than the corresponding encoder-derived pulses 530, 540. It may be substantially less likely that the encoder-derived and recognizer-derived pulses would be offset by more than one possible pulse position.

Accordingly, in accordance with one embodiment, three possible pulse position offsets between corresponding pulse positions are represented in two bits. For example, a value of "00" could indicate that the recognizer-derived pulse position occurs one possible pulse position earlier than the corresponding encoder-derived pulse position. A value of "01" could indicate that the recognizer-derived and encoder-derived pulse positions are not offset from one another, and a value of "10" could indicate that the recognizer-derived pulse position occurs one possible pulse position later than the corresponding encoder-derived pulse position. As would be obvious to one of skill in the art based on the description herein, the various possible two-bit values could represent different offsets (e.g., "00" could represent no offset, etc.).

In one embodiment, if an offset of two or more possible pulse positions in either direction is observed, the offset could be reduced to a one-position offset, by pegging the offset to one pulse position earlier or one pulse position later, whichever is closer, in order to keep the representation of the offset to two bits. Alternatively, a value of "11" could be used to represent an offset of two or more possible positions in either the earlier or later directions. In another alternate embodiment, more bits could be used to represent the offset between the encoder-derived pulse position and the recognizer-derived pulse position, so that offsets of two or more possible pulse positions can be readily and accurately represented.

In the embodiment describe above, which uses two bits to indicate the offset between each encoder-derived excitation pulse position and each recognizer-derived excitation pulse position, it would take only 20 bits (rather than 30) to enable the excitation pulse positions to be reconstructed at the receiver, assuming that the receiver has the dictionary index to the corresponding recognized speech element, and thus has (or is able to derive) the recognizer-derived excitation pulse positions. Using the recognizer-derived pulse positions and the received offset information, the receiver is able to reconstruct the encoder-derived pulse positions. Reconstruction of the speech signal is described later in conjunction with FIG. 7.

In the above-described embodiment, excitation differences are sent to the receiver when a speech element is recognized. The receiver uses the excitation differences to reconstruct the speech excitation. In an alternate embodiment, instead of reconstructing the speech excitation using excitation differences, the receiver could instead use the excitation pulses and their signs associated with the dictionary entry corresponding to the recognized speech element. Accordingly, in this alternate embodiment, it would not be necessary to calculate the excitation differences in the manner described above.

Now that specific embodiments of a speech encoding system have been described in detail, embodiments of methods for encoding and decoding speech will be described in conjunction with FIGS. 6 and 7.

Figure 6:
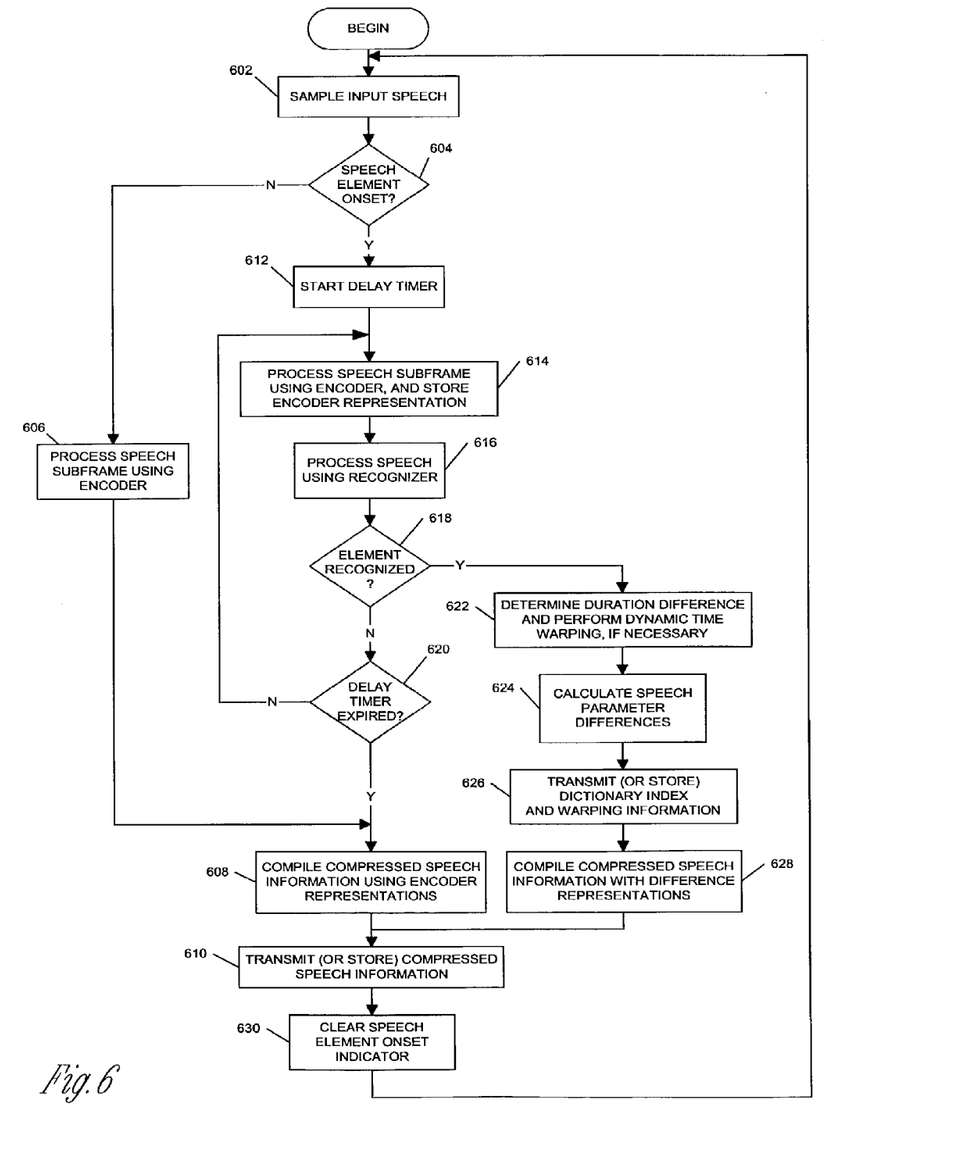
FIG. 6 illustrates a flowchart of a method for encoding input speech in accordance with an embodiment of the invention.

FIG. 6 illustrates a flowchart of a method for encoding input speech in accordance with an embodiment of the invention. The method begins, in block 602, by sampling an input signal, to produce a stream of digital speech signals. Although the sampling process is shown only at the beginning of the flowchart, the process is continuous as long as the device continues to encode the speech.

In block 604, a determination is made whether a potential speech element onset has been identified in the digital input speech. In one embodiment, this determination is made by checking a potential speech element onset indicator. A potential speech element onset could be identified when the energy of the input signal transitions rapidly from a sustained low value to a high value (e.g., when a speaker starts speaking after a pause). Alternatively, a potential speech element onset could be identified when the input signal energy is above a threshold after the end of a previous speech element. Various methods for determining a potential speech element onset are known to those of skill in the art.

If no potential speech element onset is identified, then a subframe of speech samples is processed using a speech encoder, in block 606. Compressed speech information is then compiled, in block 608, using the encoder's representation of the input speech parameters. In block 610, the compressed speech information is then transmitted over a channel or stored. A speech element onset indicator is then cleared, in block 630, although the indicator would not have been previously set if block 630 were reached through the above-described sequence of events. The procedure then iterates as shown.

Referring back to block 604, if a potential speech element onset is identified, then a delay timer (e.g., timer 210, FIG. 2) is initialized to a maximum allowable delay value, and the timer is started, in block 612. In one embodiment, the delay timer is used to determine when a speech recognizer has been given a maximum allowable amount of time to identify a speech element within the input speech, as will be explained more fully later in conjunction with block 620.

After starting the delay timer, one or more subframes of speech samples are processed by the encoder, in block 614, and the encoder representations of the compressed input speech are stored. In addition, in block 616, the input speech is processed by the speech recognizer.

In block 618, a determination is made whether the speech recognizer has recognized a speech element within the input speech signal. If not, then a determination is made whether the delay timer has expired, in block 620. If the delay timer has not expired, the method iterates as shown, giving the recognizer more time to try to identify a speech element while the encoder continues to compress the input speech.

If the delay timer has expired, then the system withdraws the recognizer's ability to affect the compressed speech information that has been determined by the encoder for the input speech signals received up to that time. Accordingly, the encoder representation of the compressed speech information is compiled, in block 608. Any encoder-derived, compressed speech information that has been stored during the delay time is released to be transmitted or stored, in block 610. The speech element onset indicator is then cleared, in block 630. The procedure then iterates as shown.

Referring back to block 618, if the speech recognizer has indicated that it has recognized a speech element before expiration of the delay timer, then a duration difference between the input speech element and the recognizer-identified dictionary speech element is determined, in block 622. If the duration difference exceeds a maximum allowable duration difference, then dynamic time warping of the recognizer-derived speech parameters is also performed, as necessary, in order to ensure that the encoder-derived and recognizer-derived speech parameters are in comparable formats.

In block 624, differences between the encoder-derived and recognizer derived speech parameters are calculated. In one embodiment, differences between excitation parameters and formant filter parameters are calculated and quantized.

In block 626, the index to the recognized speech element in the recognizer's dictionary, along with information indicating the extent of any dynamic time warping that might have been performed, are transmitted to the decoder or stored. In one embodiment, because the dictionary index and time warping information are valid for the duration of an entire speech element, and do not change from subframe-to-subframe within the speech element, the index and warping information are transmitted separately from the compressed speech parameter information transmitted in the bit stream.

In block 628, the quantized speech parameter differences are compiled with other speech parameters to represent the compressed speech. The compiled, compressed speech information is then transmitted or stored, in block 610. The speech element onset indicator is then cleared, in block 630, and the procedure iterates as shown.

Figure 7:
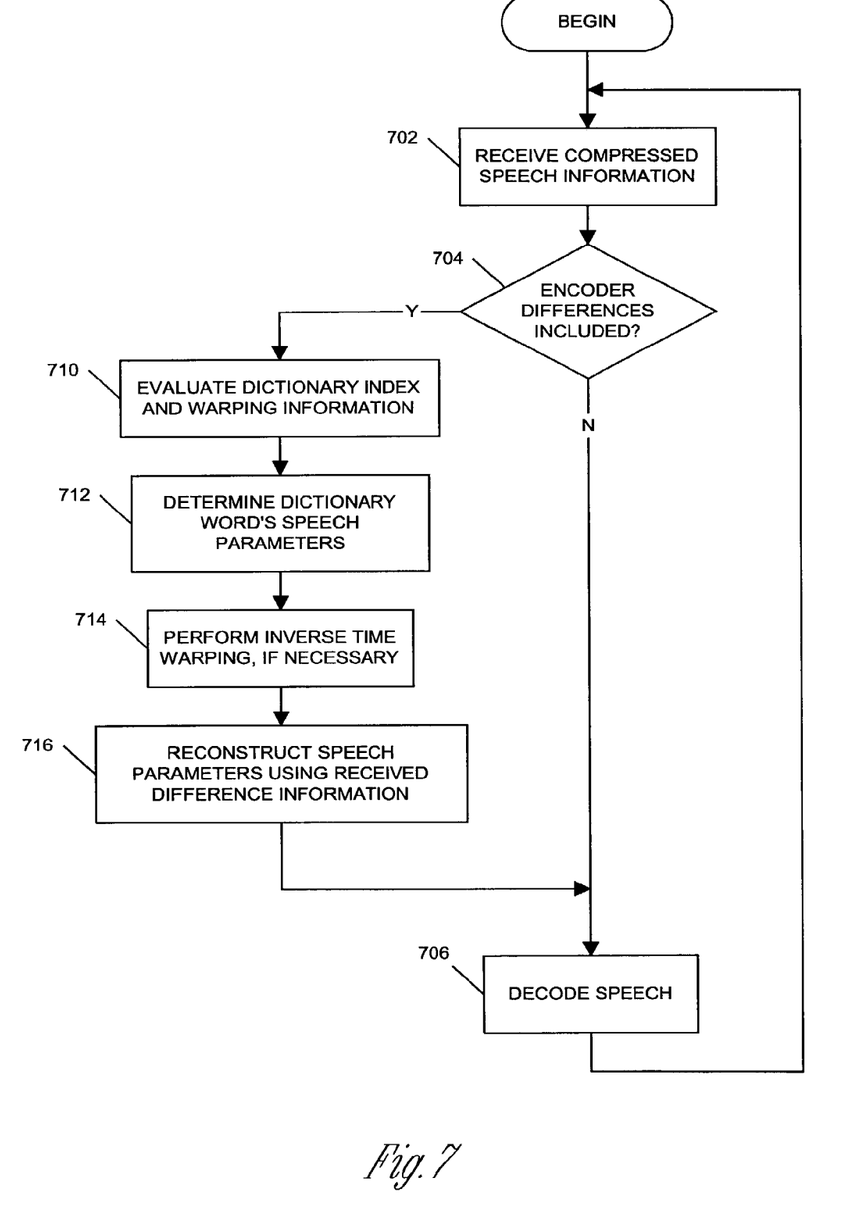
FIG. 7 illustrates a flowchart of a method for decoding compressed speech information in accordance with an embodiment of the invention.

FIG. 7 illustrates a flowchart of a method for decoding compressed speech information in accordance with an embodiment of the invention. The method begins, in block 702, when the decoder receives compressed speech information. The compressed speech information is segmented on a subframe-by-subframe basis, in one embodiment.

After the compressed speech information for a subframe has been received, a determination is made, in block 704, whether the compressed information includes encoded parameter difference information, or whether the compressed information is based solely on an encoder-derived representation of input speech. In one embodiment, an indicator whether a compressed subframe includes the encoded parameter difference information is sent to the decoder for each subframe.

If it is determined, in block 704, that the compressed speech information does not include encoded parameter difference information, then the compressed speech information is decoded, in block 706, by a speech decoder that reconstructs the speech in an inverse manner to the compression scheme used by the encoder (e.g., speech encoder 106, FIG. 1). The method then iterates as shown.

If it is determined that the compressed speech information does include encoded parameter difference information, then the dictionary index and warping information received by the decoder are evaluated, in block 710. First, the speech parameters for the identified dictionary speech element are determined, in block 712. Then, if the warping information indicates that time warping was performed on the dictionary speech parameters during the difference encoding process, then an inverse time warping process is performed, in block 714, in order to ensure that the difference parameters and the recognizer-derived speech parameters are in comparable formats.

In block 716, the speech parameters are reconstructed using the recognizer derived speech parameters and the difference parameters received from the encoder. Basically, the difference parameters are applied to the recognizer-derived speech parameters in order to reconstruct a version of the speech parameters determined by the encoder. In block 706, the decoder then reconstructs the speech in an inverse manner to the compression scheme used by the encoder. The method then iterates as shown.

The functions of the various embodiments can be practiced within a wide variety of computers, devices, and other electronic systems. The computer, device, or system could include one or more microprocessors, power supplies, storage media, interfaces to outside networks, and user interfaces.

Besides executing the various embodiments on a computer, device, or other system, a program of instructions executable by a machine to perform the methods of the various embodiments could be stored on one or more machine-readable program storage devices or computer-readable media. For example, such machine executable instructions can be stored on RAM, ROM, hard drive, CD, magnetic disk, disk drive, a combination of these types of storage media, and/or other types of storage media that are known to those of skill in the art.

Thus, a speech coder, decoder, and methods of their operation have been described, which utilize information provided by a speech recognizer to reduce the amount of bits that can be used to transmit compressed speech information. Embodiments of the invention may be used in wired or wireless devices, such as cable modems, cellular or landline telephones, network interfaces, pagers, wired or wireless LAN devices, and many other types of devices.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, it is to be understood that the appended claims are intended to cover all such alternatives, modifications, equivalents and variations as fall within the spirit of the invention.

What is claimed is:

1. A method for encoding speech, the method comprising:
processing an input speech signal using an encoder, resulting in a compressed encoder representation of the input speech signal; and
if a speech recognizer identifies, in the input speech signal, a corresponding dictionary speech element that approximates the input speech signal,
determining, with an electronic device, a compressed recognizer representation of the corresponding dictionary speech element,
calculating, with the electronic device, one or more differences between the compressed encoder representation and the compressed recognizer representation, and
compiling, with the electronic device, compressed speech information that includes representations of the one or more differences,
wherein the encoder and the speech recognizer are implemented with the electronic device.

2. A method for encoding an input speech signal, the method comprising:
processing the input speech signal using a first encoder configured (i) to compress the input speech signal by removing natural redundant information in the input speech signal, and (ii) to generate an encoded representation of the input speech signal, wherein the first encoder is implemented with an electronic device;
processing the input speech signal using a second encoder configured to compress the input speech signal by recognizing known speech elements in the input speech signal, the known speech elements stored in a memory associated with the second encoder, wherein the second encoder is implemented with the electronic device;
when the second encoder identifies a known speech element that approximates the input speech signal,
determining, with the electronic device, an encoded representation of the known speech element,
calculating, with the electronic device, one or more differences between (i) the encoded representation of the input speech signal generated by the first encoder, and (ii) the encoded representation of the known speech element generated by the second encoder, and
compiling, with the electronic device, compressed speech information that includes (i) representations of the one or more differences, and (ii) an indication of the known speech element; and when the second encoder does not identify a corresponding known speech element, compiling, with the electronic device, the compressed speech information to include the encoded representation of the input speech signal generated by the first encoder.

3. The method of claim 2, wherein:
processing the input speech signal using the first encoder comprises performing, with the electronic device, analysis-by-synthesis to generate the encoded representation of the input speech signal to include an indication of a first formant filter for the input speech signal; and
processing the input speech signal using the second encoder comprises, when the second encoder identifies the known speech element that approximates the input speech signal, generating, with the electronic device, an indication of a second formant filter corresponding to the known speech element; and
calculating the one or more differences includes calculating, with the electronic device, a set of formant filter parameter differences between the first formant filter and the second formant filter.

4. The method of claim 3, wherein:
the first formant filter includes a first set of line spectral pairs (LSPs);
the second formant filter includes a second set of LSPs; and
calculating the set of formant filter parameter differences includes calculating, for each LSP in the first set of LSPs, an LSP difference between the LSP in the first set of LSPs and a corresponding LSP in the second set of LSPs.

5. The method of claim 4, further comprising quantizing, with the electronic device, the set of formant filter parameter differences using a formant filter parameter difference codebook that includes multiple entries, each entry having a set of LSP differences.

6. The method of claim 5, wherein the formant filter parameter difference codebook includes 512 or fewer entries, so that the set of formant filter parameter differences is quantizable using 9 or fewer bits.

7. The method of claim 2, wherein:
processing the input speech signal using the first encoder comprises performing, with the electronic device, analysis-by-synthesis to generate the encoded representation of the input speech signal to include an indication of a first speech excitation for the input speech signal; and
processing the input speech signal using the second encoder comprises, when the second encoder identifies the known speech element that approximates the input speech signal, generating, with the electronic device, an indication of a second speech excitation corresponding to the known speech element; and
calculating the one or more differences comprises calculating, with the electronic device, excitation differences between the first speech excitation and the second speech excitation.

8. The method of claim 7, wherein:
the first excitation includes a first set of excitation pulse locations;
the first excitation includes a second set of excitation pulse locations; and
calculating the excitation differences includes calculating, for each excitation pulse in the first set of excitation pulses, a location difference between a first location of the excitation pulse in the first set of excitation pulses and a second location of a corresponding excitation pulse in the second set of excitation pulse locations.

9. The method of claim 8, further comprising encoding the location difference using two or fewer bits.

10. The method of claim 2, further comprising:
starting a delay timer upon recognition by the second encoder of a potential known speech element onset, wherein the delay timer is implemented with the electronic device; and
if the delay timer expires prior to the second encoder identifying a corresponding known speech element, compiling the compressed speech information to include the encoded representation of the input speech signal generated by the first encoder.

11. The method of claim 2, further comprising:
when the second encoder identifies a corresponding known speech element, determining, with the electronic device, a duration difference between an input speech duration and a duration of the corresponding known speech element; and
when the duration difference exceeds a maximum difference value, performing, with the electronic device, dynamic time warping so that the encoded representation of the known speech element generated by the second encoder corresponds in duration with the encoded representation of the input speech signal generated by the second encoder.

12. The method of claim 2, further comprising transmitting, with the electronic device, the compressed speech information over a transmission channel.

13. The method of claim 2, further comprising storing the compressed speech information.

14. An apparatus, comprising:
a first speech encoder configured (i) to compress an input speech signal by removing natural redundant information in the input speech signal, and (ii) to generate an encoded representation of the input speech signal;
a memory to store known speech elements;
a second speech encoder coupled to the memory, the second speech encoder configured to recognize, in the input speech signal, known speech elements from the memory, and, when a known speech element that approximates the input speech signal is identified, determine an encoded representation of the known speech element;
a difference encoder configured to, when the second encoder identifies a known speech element that approximates the input speech signal,
calculate one or more differences between (i) the encoded representation of the input speech signal generated by the first encoder, and (ii) the encoded representation of the known speech element generated by the second encoder, and
compile compressed speech information that includes (i) representations of the one or more differences, and (ii) an indication of the known speech element; and
a transmitter configured (i) to transmit, when the second speech encoder identifies the corresponding known speech element, the compressed speech information that includes representations of the one or more differences, and (ii) to transmit, when the second speech encoder does not identify a known speech element that approximates the input speech signal, the encoded representation of the input speech signal generated by the first speech encoder.

15. The apparatus of claim 14, wherein:
the first speech encoder includes an analysis-by-synthesis encoder configured to determine an indication of a first formant filter for the input speech signal;

the second speech encoder is configured to, when a known speech element that approximates the input speech signal is identified, determine an indication of a second formant filter for the corresponding known speech element; and the difference encoder is configured to calculate a set of formant filter parameter differences between the first formant filter and the second formant filter.

16. The apparatus of claim 15, wherein:
the first speech encoder is configured to determine a first set of line spectral pairs (LSPs);
the second speech recognizer is configured to determine a second set of LSPs; and
the difference encoder is configured to calculate, for each LSP in the first set of LSPs, an LSP difference between the LSP in the first set of LSPs and a corresponding LSP in the second set of LSPs.

17. The apparatus of claim 16, wherein the difference encoder is configured to quantize the set of formant filter parameter differences using a formant filter parameter difference codebook that includes multiple entries, each entry having a set of LSP differences.

18. The apparatus of claim 14, wherein:
the first speech encoder includes an analysis-by-synthesis encoder configured to determine an indication of a first speech excitation for the input speech signal;
the second speech encoder is configured to, when a known speech element that approximates the input speech signal is identified, determine an indication of a second speech excitation for the corresponding known speech element; and
the difference encoder is configured to calculate excitation differences between the first speech excitation and the second speech excitation.

19. The apparatus of claim 14, further comprising an electronic information storage device for storing the compressed speech information,
wherein the channel transmitter is configured to store data to the electronic information storage device.

20. A tangible, non-transitory computer readable storage medium storing instructions that, when executed by a processor, cause the processor to:
process an input speech signal using a first encoder configured (i) to compress the input speech signal by removing natural redundant information in the input speech signal, and (ii) to generate an encoded representation of the input speech signal;
process the input speech signal using a second encoder configured to compress the input speech signal by recognizing known speech elements in the input speech signal, the known speech elements stored in a memory associated with the second encoder;
when the second encoder identifies a known speech element that approximates the input speech signal,
  determine an encoded representation of the known speech element,
  calculate one or more differences between (i) the encoded representation of the input speech signal generated by the first encoder, and (ii) the encoded representation of the known speech element generated by the second encoder, and
  compile compressed speech information that includes (i) representations of the one or more differences, and (ii) an indication of the known speech element; and
when the second encoder does not identify a corresponding known speech element, compile the compressed speech information to include the encoded representation of the input speech signal generated by the first encoder.

21. The computer readable storage medium of claim 20, storing instructions that, when executed by a processor, cause the processor to:
process the input speech signal using the first encoder at least by performing analysis-by-synthesis to generate the encoded representation of the input speech signal to include an indication of a first formant filter for the input speech signal;
process the input speech signal using the second encoder at least by, when the second encoder identifies the known speech element that approximates the input speech signal, generating an indication of a second formant filter corresponding to the known speech element; and
calculate the one or more differences at least by calculating a set of formant filter parameter differences between the first formant filter and the second formant filter.

22. The computer readable medium of claim 21, wherein:
the first formant filter includes a first set of line spectral pairs (LSPs);
the second formant filter includes a second set of LSPs; and
the computer readable medium stores instructions that, when executed by a processor, cause the processor to calculate the set of formant filter parameter differences at least by calculating, for each LSP in the first set of LSPs, an LSP difference between the LSP in the first set of LSPs and a corresponding LSP in the second set of LSPs.

23. The computer readable medium of claim 22, storing instructions that, when executed by a processor, cause the processor to quantize the set of formant filter parameter differences using a formant filter parameter difference codebook that includes multiple entries, each entry having a set of LSP differences.

24. The computer readable medium of claim 20, storing instructions that, when executed by a processor, cause the processor to:
process the input speech signal using the first encoder at least by performing analysis-by-synthesis to generate the encoded representation of the input speech signal to include an indication of a first speech excitation for the input speech signal; and
process the input speech signal using the second encoder at least by, when the second encoder identifies the known speech element that approximates the input speech signal, generating an indication of a second speech excitation corresponding to the known speech element; and
calculate the one or more differences at least by calculating excitation differences between the first speech excitation and the second speech excitation.

25. The computer readable medium of claim 24, wherein:
the first excitation includes a first set of excitation pulse locations;
the first excitation includes a second set of excitation pulse locations; and
the computer readable medium stores instructions that, when executed by a processor, cause the processor to calculate the excitation differences at least by calculating, for each excitation pulse in the first set of excitation pulses, a location difference between a first location of the excitation pulse in the first set of excitation pulses and a second location of a corresponding excitation pulse in the second set of excitation pulse locations.

26. The computer readable medium of claim 20, storing instructions that, when executed by a processor, cause the processor to:

start a delay timer upon recognition by the second encoder of a potential known speech element onset; and if the delay timer expires prior to the second encoder identifying a corresponding known speech element, compile the compressed speech information to include the encoded representation of the input speech signal generated by the first encoder.

27. The computer readable medium of claim 20, storing instructions that, when executed by a processor, cause the processor to:

when the second encoder identifies a corresponding known speech element, determine a duration difference between an input speech duration and a duration of the corresponding known speech element; and when the duration difference exceeds a maximum difference value, perform dynamic time warping so that the encoded representation of the known speech element generated by the second encoder corresponds in duration with the encoded representation of the input speech signal generated by the second encoder.

* * * * *